(12) United States Patent
Li et al.

(10) Patent No.: US 11,977,296 B2
(45) Date of Patent: May 7, 2024

(54) BACKLIGHT MODULE AND DISPLAY DEVICE

(71) Applicant: TCL CHINA STAR OPTOELECTRONICS TECHNOLOGY CO., LTD., Shenzhen (CN)

(72) Inventors: Lixia Li, Shenzhen (CN); Zhijuan Long, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 669 days.

(21) Appl. No.: 17/259,180

(22) PCT Filed: Dec. 28, 2020

(86) PCT No.: PCT/CN2020/140316
§ 371 (c)(1),
(2) Date: Jan. 10, 2021

(87) PCT Pub. No.: WO2022/126737
PCT Pub. Date: Jun. 23, 2022

(65) Prior Publication Data
US 2022/0342260 A1 Oct. 27, 2022

(30) Foreign Application Priority Data
Dec. 16, 2020 (CN) .......................... 202011486253.6

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01)

(58) Field of Classification Search
CPC .................... G02F 1/133612; G02F 1/133603
See application file for complete search history.

(56) References Cited

U.S. PATENT DOCUMENTS

2022/0130747 A1 * 4/2022 Wang ................ H01L 23/49838

FOREIGN PATENT DOCUMENTS

| CN | 1568120 A | * | 1/2005 |
| CN | 1568120 A |   | 1/2005 |

(Continued)

*Primary Examiner* — Robert J Michaud
(74) *Attorney, Agent, or Firm* — The Roy Gross Law Firm, LLC; Roy Gross

(57) ABSTRACT

A backlight module and a display device are provided. The backlight module includes a first data line, a second data line, and a light-emitting diode group. The light-emitting diode group includes two or more light-emitting diode units. A voltage at a connection point between a n-th light-emitting diode unit and the first data line is defined as $V_n$. A voltage at a connection point between the n-th light-emitting diode unit and the second data line is defined as $U_n$. In response to $V_i$ is greater than $V_j$, $U_i$ is greater than $U_j$.

20 Claims, 6 Drawing Sheets

(56) References Cited

FOREIGN PATENT DOCUMENTS

| | | | |
|---|---|---|---|
| CN | 1652652 | A | 8/2005 |
| CN | 104813391 | A | 7/2015 |
| CN | 108335667 | A | 7/2018 |
| CN | 109906477 | A | 6/2019 |
| CN | 110221476 | A | 9/2019 |
| CN | 110675819 | A | 1/2020 |
| CN | 111913323 | A | 11/2020 |
| KR | 20140029811 | A | 3/2014 |
| KR | 20160047083 | A | 5/2016 |
| TW | 200838354 | A | 9/2008 |

\* cited by examiner

BACKLIGHT MODULE AND DISPLAY DEVICE

CROSS REFERENCE TO RELATED APPLICATIONS

This application is a National Phase of PCT Patent Application No. PCT/CN2020/140316 having International filing date of Dec. 28, 2020, which claims the benefit of priority of Chinese Application No. 202011486253.6 filed on Dec. 16, 2020. The contents of the above applications are all incorporated by reference as if fully set forth herein in their entirety.

FIELD OF DISCLOSURE

The present disclosure relates to the field of backlights, in particular to a backlight module and a display device.

BACKGROUND

Mini light-emitting diode (LED) backlights adopt an active type, and the LED uses thin film transistor (TFT) devices to control its light emission. Due to a resistance of a signal line, there is a voltage drop (IR Drop) in a signal, which causes brightness differences in different positions and affects uniformity of display brightness of a whole machine.

SUMMARY OF DISCLOSURE

The present disclosure provides a backlight module and a display device to solve the technical problems of uneven brightness of LEDs at different positions of the backlight module.

The technical solutions to solve the above technical problems are as follows. The present disclosure provides a backlight module, including: a first data line, a second data line, and a light-emitting diode group. The first data line includes a first terminal and a second terminal, and the first terminal is connected to a power terminal. The second data line includes a third terminal and a fourth terminal, and the fourth terminal is connected to a ground terminal. The light-emitting diode group includes at least two light-emitting diode units. One end of each of the light-emitting diode units is connected to the first data line, and another end of each of the light-emitting diode units is connected to the second data line. A voltage at a connection point of a n-th light-emitting diode unit and the first data line is defined as $V_n$. A voltage at a connection point of the n-th light-emitting diode unit and the second data line is defined as $U_n$. In response to $V_i$ is greater than $V_j$, $U_i$ is greater than $U_j$.

Furthermore, at least one first node is disposed on the first data line, and at least one second node is disposed on the second data line. An anode of one of the light-emitting diode units is connected to one first node, and a cathode of the one of the light-emitting diode units is connected to one corresponding second node.

Furthermore, n first nodes are disposed on the first data line, and n second nodes are disposed on the second data line. A resistance value between a j-th first node and a j+1-th first node is defined as Rdj. A resistance value between a j-th second node and a j+1-th second node is defined as Rsj, and (n−j)*Rdj=j*Rsj.

Furthermore, a direction of current flowing into the first data line is a direction from the first terminal to the second terminal.

A direction of current flowing into the second data line is a direction from the third terminal to the fourth terminal.

In the direction of current, a voltage difference between two adjacent first nodes is $H_1$, and a voltage difference between two adjacent second nodes is $H_2$, and $H_1=H_2$.

Furthermore, a resistance value between any two adjacent first nodes is equal. A resistance value between any two adjacent second nodes is equal. The resistance value between any two adjacent first nodes is equal to the resistance value between any two adjacent second nodes.

Furthermore, the backlight module further includes a substrate and a chip on film. The first data line and the second data line are arranged parallel to each other and spaced apart from each other on a surface of the substrate. The chip on film is disposed on at least one side of the substrate. The first terminal and the fourth terminal are connected to the chip on film.

Furthermore, the backlight module further includes a first extension line, a first connection line, and a chip on film. The first extension line and the first data line are arranged parallel to each other and spaced apart from each other. Two opposite ends of the first connection line are respectively electrically connected to the first terminal and an end of the first extension line adjacent to the first terminal. The chip on film is disposed on a side of the substrate close to the ground terminal, and one end of the first extension line away from the first connection line is connected to the chip on film.

Furthermore, the backlight module further includes a second extension line, a second connection line, and a chip on film. The second extension line and the second data line are arranged parallel to each other and spaced apart from each other. Two opposite ends of the second connection line are respectively electrically connected to the fourth terminal and an end of the second extension line adjacent to the fourth terminal. The chip on film is disposed on a side of the substrate close to the power terminal, and one end of the second extension line away from the second connection line is connected to the chip on film.

Furthermore, the power terminal and the ground terminal are respectively disposed on two opposite sides of the substrate, the chip on film is disposed on the two opposite sides of the substrate, and is electrically connected to the first terminal and/or the fourth terminal on a corresponding side.

The present disclosure also provides a display device, including a liquid crystal display panel and the backlight module mentioned above. The liquid crystal display panel is connected to the backlight module, and the backlight module is configured to provide a backlight source for the liquid crystal display panel.

Advantages of the present disclosure are as follows. In the backlight module and the display device of the present disclosure, the direction of current of the first data line or the second data line is changed, so the direction of current of the first data line is the same as the direction of current of the second data line. Thus, a voltage drop can be formed in the same direction to compensate for a voltage drop (IR Drop), thereby maintaining the same voltage on both sides of each light-emitting diode unit, and improving brightness uniformity of the light-emitting diode group.

BRIEF DESCRIPTION OF DRAWINGS

The following describes the specific embodiments of the present disclosure in detail with reference to the accompanying drawings to make the technical solutions and other beneficial effects of the present disclosure obvious.

Figure 1:
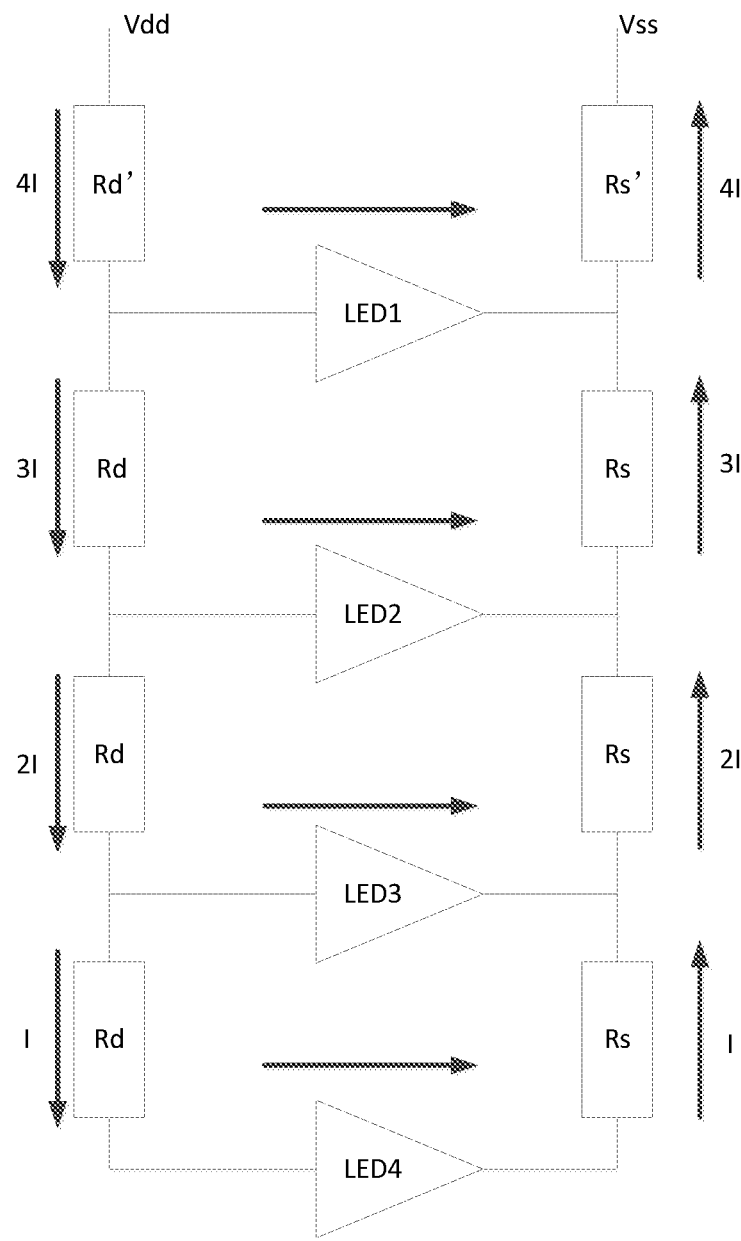
FIG. 1 is a circuit diagram of a backlight module in a related technology.

Reference numerals in the drawings are as follows.
substrate 110; light-emitting diode group 120;
first data line 130; second data line 140;
chip on film 150; first terminal 131;
second terminal 132; first node 133;
third terminal 141; fourth terminal 142;
second node 143; light-emitting diode unit 121;
first connection line 134; first extension line 135;
second connection line 144; second extension line 145

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within the protection scope of the present disclosure.

In a related technology, one LED is used to represent one partition, and partitions are arranged in parallel. A voltage difference between a power terminal (Vdd) and a ground terminal (Vss) determines brightness of the LED. Due to a resistance of a wire connected to the Vdd and a wire connected to the Vss, a voltage on the wire gradually decreases in a direction of current flow. In a reverse current direction, the voltage on the wire gradually increases.

If an impedance of the wire connected to the Vdd is Rd, an impedance of the wire connected to the Vss is Rs, and an effective current on the wire is I, then an end Vdd'=Vdd−I*Rd, and an end Vss'=Vss+I*Rs (in the reverse current direction).

For an LED adjacent to the power terminal, a voltage difference between its two ends is Vled=Vdd−Vss. For an LED at an end, a voltage difference between its two ends is Vled'=Vdd'−Vss'=Vdd−I*Rd−(Vss+I*Rs)=Vled−I*Rd−I*Rs<Vled. Therefore, a brightness of the LED at the end is less than that of the LED adjacent to power terminal, which shows uneven brightness.

Specifically, FIG. 1 is a circuit diagram of a backlight module in the related technology. A circuit in FIG. 1 includes a first data line, a second data line, and 4 LED lights. One end of the first data line is connected to the Vdd. One end of the second data line is connected to Vss. Currents on the first data line and the second data line flow in opposite directions. 4 LED lights are arranged in parallel between the first data line and the second data line. According to A circuit connection relationship, a resistance on the first data line can be subdivided into Rd' and Rd. The Rd' is a resistance between the VDD and an LED1. The Rd is a resistance between the LED1 and an LED2, the LED2 and an LED3, and the LED3 and an LED4. A resistance on the second data line can be subdivided into Rs' and Rs. The Rs' is a resistance between the VSS and the LED1 on the second data line. The Rs is a resistance between the LED1 and the LED2, the LED2 and the LED3, and the LED3 and the LED4.

A voltage across the LED1 is as follows:

$$Vled1=(Vdd-4I*Rd')-(Vss+4I*Rs')$$

$$=Vdd-Vss-4I*(Rd'+Rs')$$

A voltage across the LED2 is as follows:

$$Vled2=(Vdd-4I*Rd'-3I*Rd)-(Vss+4I*Rs'+3I*Rs)$$

$$=Vdd-Vss-4I*(Rd'+Rs')-3I*(Rd+Rs)$$

A voltage across the LED3 is as follows:

$$Vled3=(Vdd-4I*Rd'-3I*Rd-2I*Rd)-(Vss+4I*Rs'+3I*Rs+2I*Rs)$$

$$=Vdd-Vss-4I*(Rd'+Rs')-(3I+2I)*(Rd+Rs)$$

A voltage across the LED4 is as follows:

$$Vled4=(Vdd-4I*Rd'-3I*Rd-2I*Rd-I*Rd)-(Vss+4I*Rs'+3I*Rs+2I*Rs+I*Rs)$$

$$=Vdd-Vss-4I*(Rd'+Rs')-(3I+2I+I)*(Rd+Rs)$$

Brightness of the 4 LEDs is positively correlated with the actual voltage across them. A difference between the actual voltage across the LED4 and an ideal voltage is the largest, and the difference is related to operating currents of the LEDs, a number of divisions (number of rows), and the resistance of the lines connected to the Vdd and the Vss. The smaller these factors are, the smaller an IR drop. A maximum value of the IR drop=Vled4−Vled1=6I*(Rd+Rs).

In this embodiment, the display device of the present disclosure includes a backlight module and a liquid crystal display panel. The liquid crystal display panel is connected to the backlight module. The backlight module is configured to provide backlight for the liquid crystal display panel.

A structure of the liquid crystal display panel can adopt the settings in the related technology, and the present disclosure will not go into details.

Figure 2:
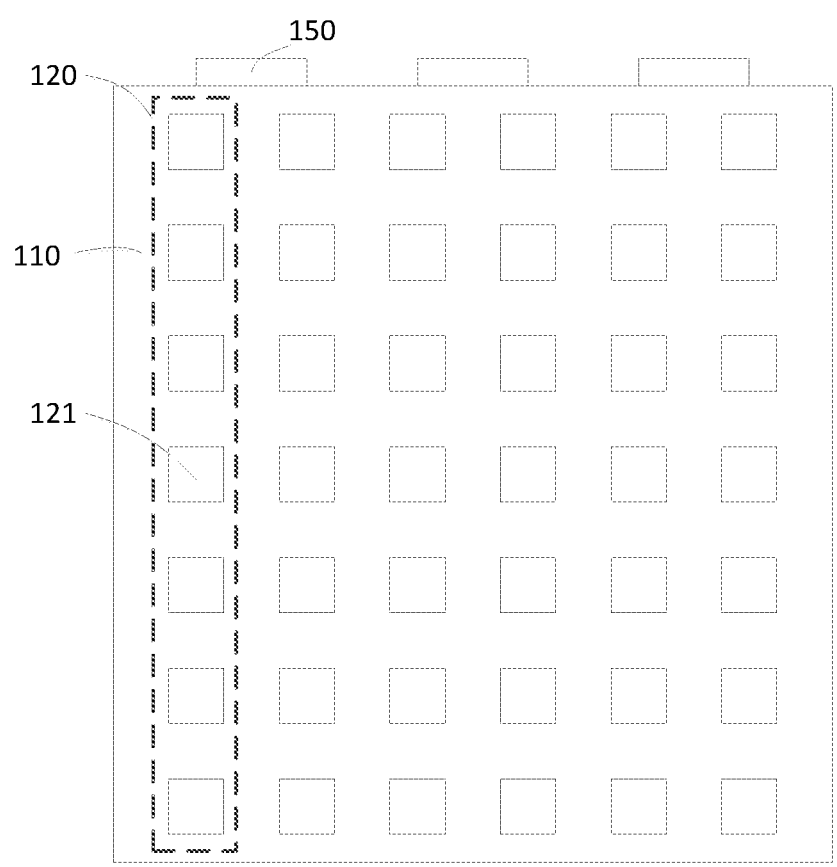
FIG. 2 is a schematic diagram of a backlight module in an embodiment.
Figure 3:
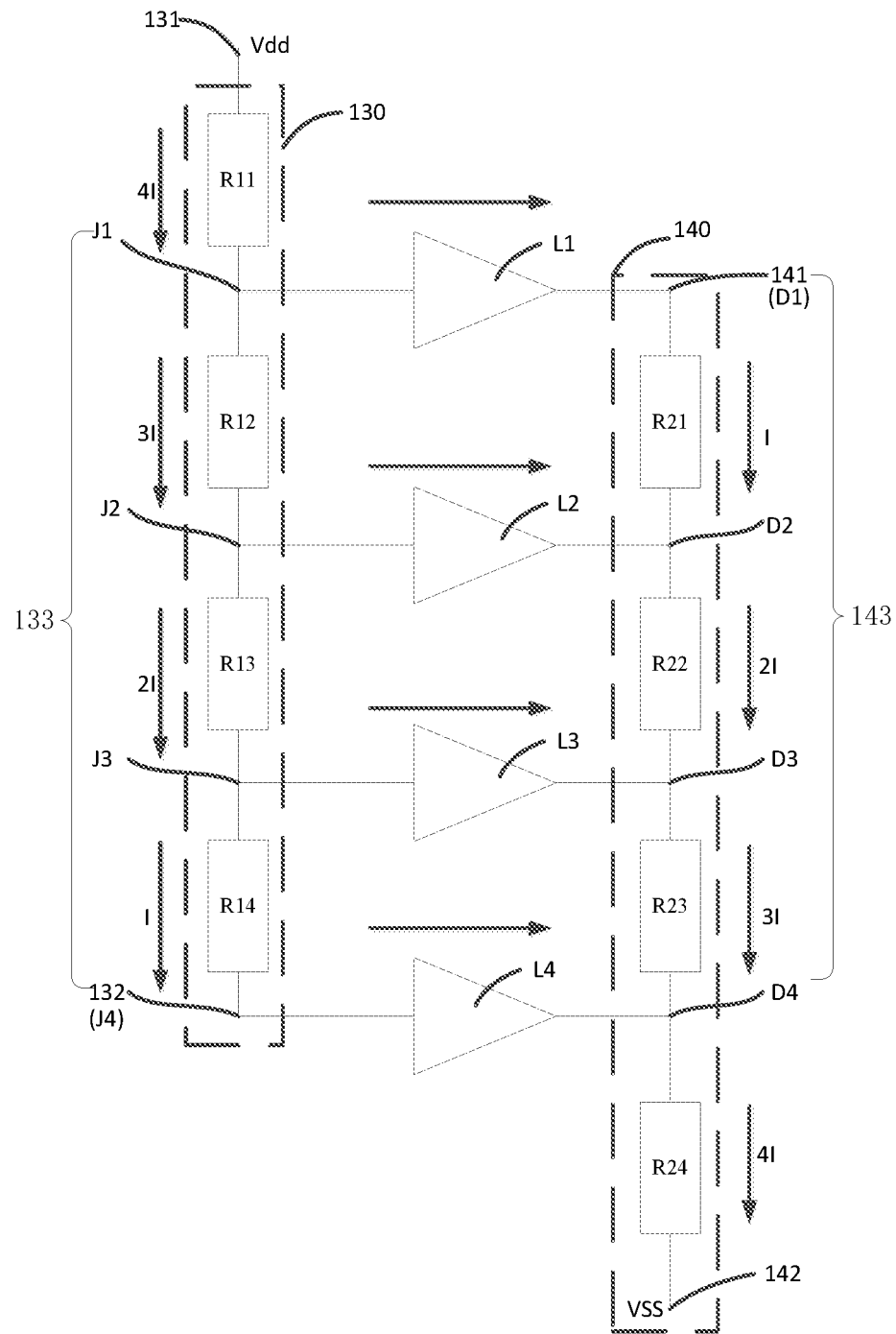
FIG. 3 is a circuit diagram with 4 LEDs in the embodiment.

Specifically, as shown in FIG. 2 and FIG. 3, FIG. 2 is a schematic diagram of a backlight module in an embodiment, and FIG. 3 is a circuit diagram with 4 LEDs in the embodiment. The backlight module includes a substrate 110, a light-emitting diode group 120, a first data line 130, a second data line 140, and a chip on film 150.

The first data line 130 and the second data line 140 are arranged parallel to each other on a surface of the substrate 110. Specifically, the first data line 130 and the second data line 140 are spaced apart from each other. There is a space between the first data line 130 and its adjacent second data line 140. The space is configured to accommodate the light-emitting diode group 120. The first data line 130 is connected to an external high-level signal (power supply). The second data line 140 is connected to an external low-level signal (ground). Both ends of the light-emitting diode group 120 are connected to the first data line 130 and the second data line 14, respectively. Since there is a voltage difference between the first data line 130 and the second data line 140, the light-emitting diode group 120 is excited to emit fluorescence. In order to ensure unit brightness uniformity of the backlight module, it is necessary to ensure that a current flowing into the light-emitting diode group 120 tends to be consistent.

Specifically, as shown in FIG. 3, the first data line 130 includes a first terminal 131, a second terminal 132, and a plurality of first nodes 133. The first terminal 131 is connected to the high-level signal (power supply). The plurality of first nodes 133 are evenly arranged on the first data line 130. The plurality of first nodes 133 are connected to an anode of the light-emitting diode group 120.

The second data line 140 includes a third terminal 141, a fourth terminal 142, and a plurality of second nodes 143. The fourth terminal 142 is connected to the external low-level signal (ground). The plurality of second nodes 143 are evenly arranged on the second data line 140, and each second node 143 corresponds to one first node 133. The plurality of second nodes 143 are connected to a cathode of the light-emitting diode group 120.

The light-emitting diode group 120 includes a plurality of light-emitting diode units 121 connected in parallel. Two ends of each light-emitting diode unit 121 are respectively connected to the first data line 130 and the second data line 140. In this embodiment, a voltage at a connection point between a n-th light-emitting diode unit 121 and the first data line 130 is defined as $V_n$. A voltage at a connection point of the n-th light-emitting diode unit 121 and the second data line 140 is defined as $U_n$. In response to $V_i$ is greater than $V_j$, $U_i$ is greater than $U_j$. In response to $V_i$ is less than $V_j$, Ui is less than $U_j$. That is, current directions of the first data line 130 and the second data line 140 between two adjacent light-emitting diode units 121 are the same.

Specifically, taking FIG. 3 as an example, the light-emitting diode group 120 includes four light-emitting diode units 121 (L1, L2, L3, L4). The first data line 130 includes 4 first nodes 133 (J1, J2, J3, J4). The second data line 140 includes 4 second nodes 143 (D1, D2, D3, D4). The J1, the J2, the J3, and the J4 are spaced apart from each other at a same interval. The D1, the D2, the D3, and the D4 are spaced apart from each other at a same interval. The J4 coincides with the second terminal 132. The D1 coincides with the third terminal 141. Both ends of the L1 are connected to the J1 and the third terminal 141, respectively. Both ends of the L2 are connected to the J2 and the D2, respectively. Both ends of the L3 are connected to the J3 and the D3, respectively. Both ends of the L4 are connected to the second terminal 132 and the D4, respectively. The resistance between the first terminal 131 and J1 is R11. The resistance between J1 and J2 is R12. A resistance between the J2 and the J3 is R13. A resistance between the J3 and the second terminal 132 is R14. The R11, the R12, the R13, and the R14 are the same.

Specifically, since the light emitting diode units 121 are connected in parallel between the first data line 130 and the second data line 140, and the first data line 130 and the second data line 140 have resistances, currents on the first data line 130 gradually decrease from the first terminal 131 to the second terminal 132. If a current flowing from the first terminal 131 to the J1 is 4I, a current flowing from the J1 to the J2 is 3I. By that analogy, a current flowing from the J2 to the J3 is 2I. A current flowing from the J4 to the second terminal 132 is I. Similarly, a voltage of the fourth terminal 142 is lower than a voltage of the third terminal 141, so currents on the second data line 140 gradually increase from the third terminal 141 to the fourth terminal 142. If a current flowing from the third terminal 141 to the D2 is I, a current flowing from the D2 to the D3 is 2I. By that analogy, a current flowing from the D3 to the D4 is 3I. A current flowing from the D4 to the fourth terminal 142 is 4I.

A voltage V1 across the L1=(Vdd−4I*R1)−(Vss+4I*R2+3I*R2+2I*R2+I*R2)=Vdd−Vss−4I*(R1+R2)−(3I+2I+I)*R2, where R1 is equivalent to R11, R12, R13, or R14, and R2 is equivalent to R21, R22, R23, or R24.

A voltage V2 across the L2=(Vdd−4I*R1−3I*R1)−(Vss+4I*R2+3I*R2+2I*R2)=Vdd−Vss−4I*(R1+R2)−3I*(R1+R2)−2I*R2, where R1 is equivalent to R11, R12, R13, or R14, and R2 is equivalent to R21, R22, R23, or R24.

A voltage V3 across the L3=(Vdd−4I*R1−3I*R1−2I*R1)−(Vss+4I*R2+3I*R2)=Vdd−Vss−4I*(R1+R2)−3I*(R1+R2)−2I*R1, where R1 is equivalent to R11, R12, R13, or R14, and R2 is equivalent to R21, R22, R23, or R24.

A voltage V4 across the L4=(Vdd−4I*R1−3I*R1−2I*R1−I*R1)−(Vss+4I*R2)=Vdd−Vss−4I*(R1+R2)−(3I+2I+I)*R2, where R1 is equivalent to R11, R12, R13, or R14, and R2 is equivalent to R21, R22, R23, or R24.

According to the above formulas, a maximum value of IR Drop is I*(3R1−R2). When R1 is equal to R2, the maximum voltage drop (IR Drop) is 2I*R1. In comparison with the maximum voltage drop (12*I*R1) in the prior art under the same conditions, the design in this embodiment reduces the maximum voltage drop to one-sixth. An overall brightness of the light-emitting diode group 120 is improved, and brightness uniformity of the light-emitting diode units 121 is improved.

In another embodiment of the present disclosure, the plurality of first nodes 133 may be unevenly arranged on the first data line 130, and the plurality of second nodes 143 may be unevenly arranged on the second data line 140, so that R12, R13, and R14 may be different, and R21, R22, R23 may also be different. Alternatively, resistivities of the first data line 130 between two adjacent first nodes 133 may be different. Alternatively, resistivities of the second data line 140 between two adjacent second nodes 143 may be different. Hence, R12, R13, and R14 may be different, and R21, R22, and R23 may also be different. At this time, only followings need to be met:

3*R12=R21, R13=R22, and R14=3*R23. Since the current flowing from the first terminal 131 to the J1 is 4I, the current flowing from the J1 to the J2 is 3I, the current flowing from the J2 to the J3 is 2I, and the current flowing from the J4 to the second terminal 132 is I. The current flowing from the third terminal 141 to the D2 is I. The current flowing from the D2 to the D3 is 2I. The current flowing from the D3 to the D4 is 3I. The current flowing from the D4 to the fourth terminal 142 is 4I. According to a voltage formula V=R*I, 3I*R12=I*(3*R12)=I*R21, 2I*R13=2I*R21, 3I*R14=I*(3*R23)=3I*R23. That is, a voltage difference between two adjacent first nodes 133 is equal to a voltage difference between two adjacent second nodes 143. That is, a voltage across each light-emitting diode unit 121 are the same, thereby eliminating uneven brightness caused by the voltage drop.

Figure 4:
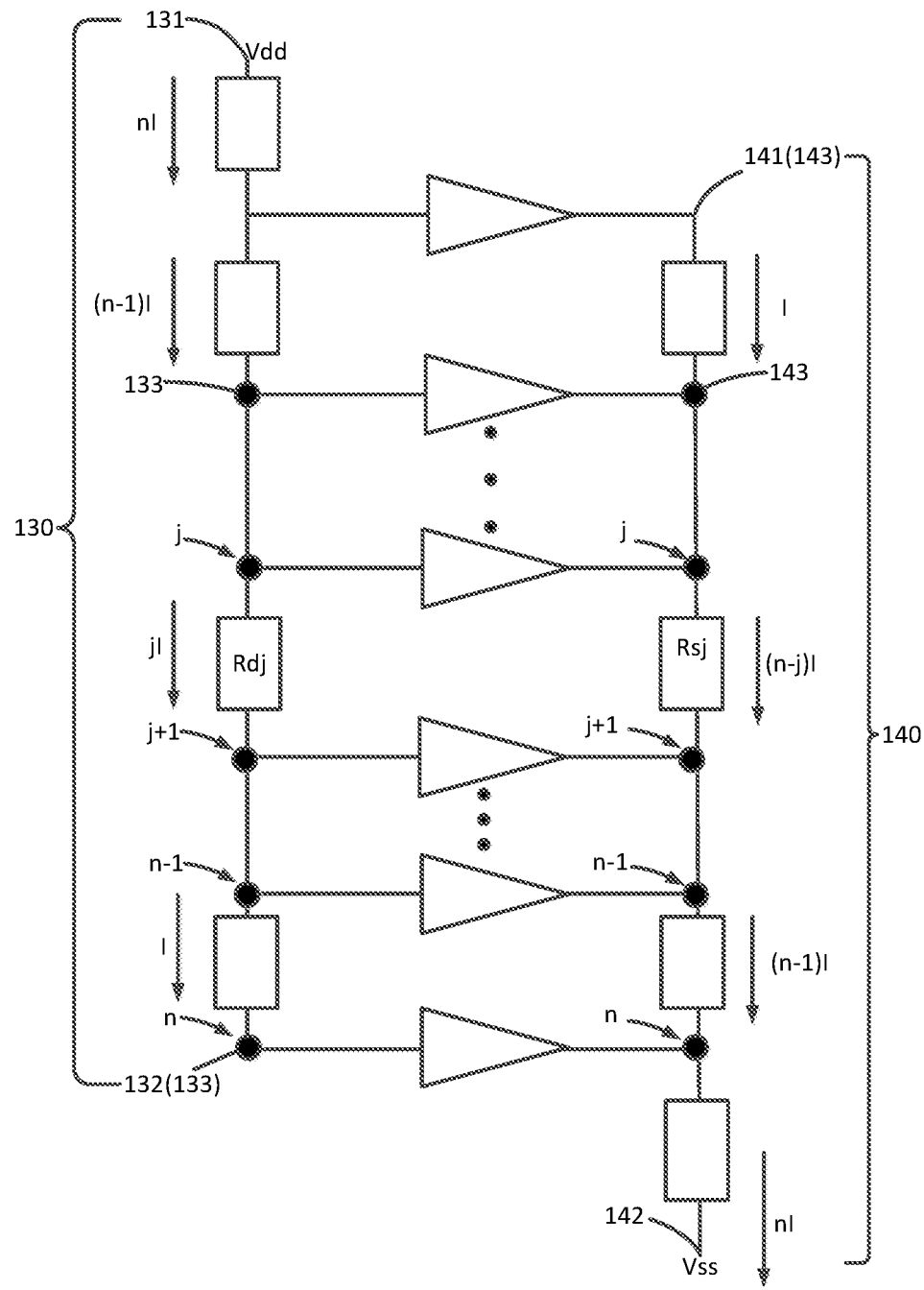
FIG. 4 is a circuit diagram with n LEDs in an embodiment.

In another embodiment, as shown in FIG. 4, the light-emitting diode group 120 includes n light-emitting diode units 121. There are n first nodes 133 on the first data line 130. There are n second nodes 143 on the second data line 140. A first second node 143 of the second data line 140 coincides with the third terminal 141. A n-th first node 133 of the first data line 130 coincides with the second terminal 132. A resistance value between a j-th first node and a j+1-th first node is defined as Rdj. A resistance value between a j-th second node and a j+1-th second node is defined as Rsj. If a current value between the first terminal 131 and the first first node 133 is n*I, a current value between the j-th first node and the j+1-th first node is j*I. If a current value between a first second node and a second second node is I, a current value between the j-th second node and the j+1-th second node is (n−j)*I. A voltage difference between the j-th first node and the j+1-th first node is j*I*Rdj. A voltage difference between the j-th second node and the j+1-th second node is $(n-j)*I*Rsj$. If a condition of $(nj)*Rdj=j*Rsj$ is satisfied, the voltage difference between the j-th first node and the j+1-th first node and the voltage difference between the j-th second node and the j+1-th second node are equal, and the voltage across each light-emitting diode unit 121 is the same. Apparently, the resistance value can be adjusted by adjusting a spacing between the first node 133 or the second node 143, or adjusting a diameter of the first data line 130 or the second data line 140. The method of adjusting the resistance value can also be any method in the related art that can adjust the resistance value.

In this embodiment, an input voltage of the first terminal 131 is the VDD. A voltage connected to the fourth terminal 142 is the ground signal (VSS). Since the first data line 130 and the second data line 140 have certain resistance values, currents flowing into the light-emitting diode units 121 will be different due to distances between the two ends of the light-emitting diode units 121 and the first terminal 131 and the fourth terminal 142. The first terminal 131 and the fourth terminal 142 are respectively arranged on both sides of the light-emitting diode group 120, so that a sum of distances between anodes and the first terminal of each light-emitting diode unit and a sum of distances between cathodes and the second terminal are approximately equal. That is, resistance values of the input and output of each light-emitting diode unit are approximately equal. When the voltages are equal and the resistance values are equal, the currents flowing into the light emitting diode units 121 are the same. That is, it is ensured that brightness of the light emitting diode units 121 are consistent.

The chip on films 150 are disposed on one or more sides of the substrate 110 to connect the first data line 130 and the second data line 140.

In this embodiment, the first terminal 131 of the first data line 130 is connected to a power source. The fourth terminal 142 of the second data line 140 is grounded. Therefore, both the first terminal 131 and the fourth terminal 142 need to be connected to the chip on films 150. Since the first terminal 131 and the fourth terminal 142 respectively correspond to different sides of the substrate 110, the chip on films 150 need to be arranged on two opposite sides of the substrate 110.

Figure 5:
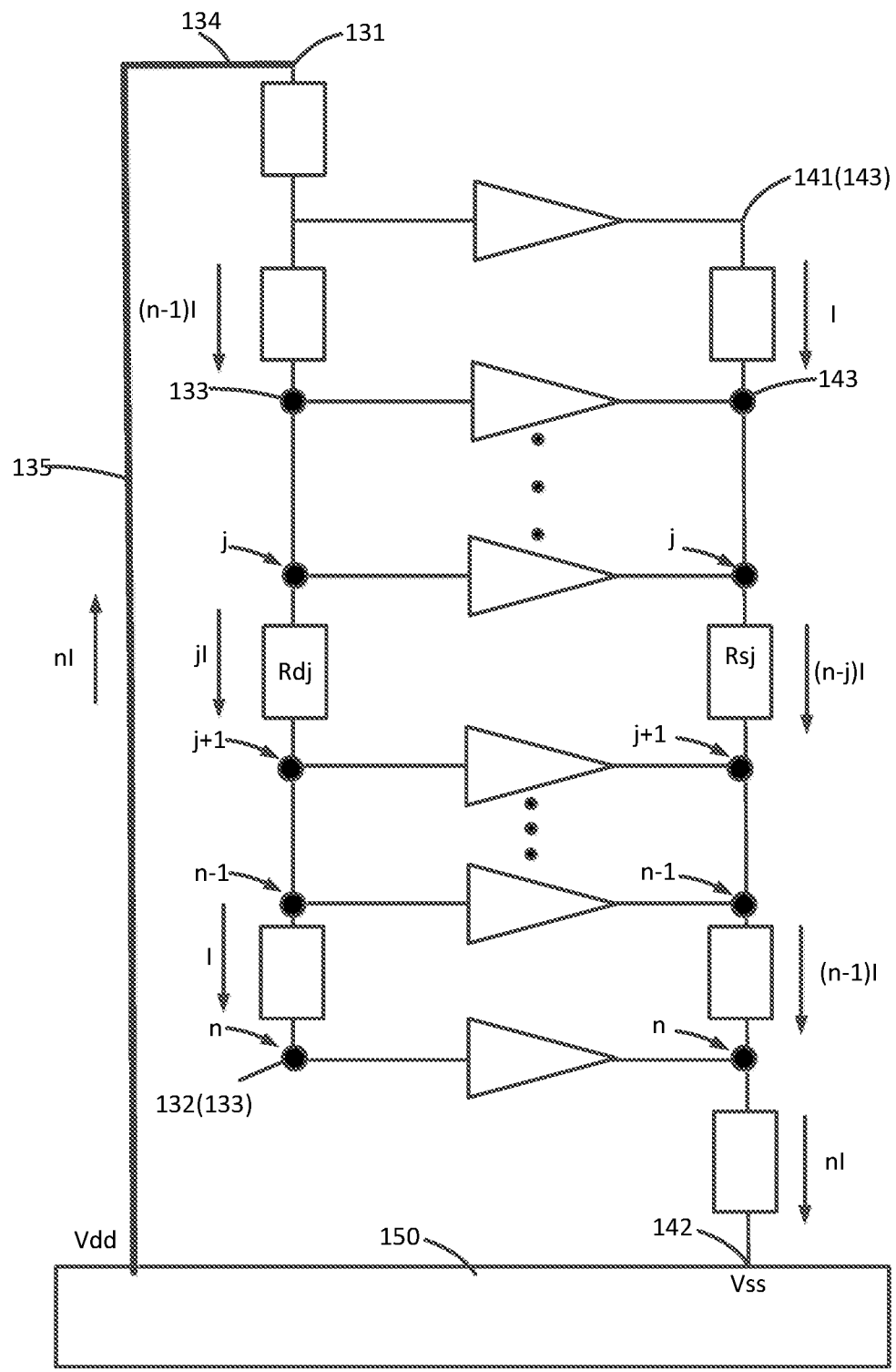
FIG. 5 is a circuit diagram showing a setting of a first extension line and a first connection line in an embodiment.

In other preferred embodiments of the present disclosure, as shown in FIG. 5, a method of adding connecting lines and extension lines may be adopted, so that the first terminal 131 and the fourth terminal 142 can be connected to the chip on films 150 on the same side of the substrate 110, thereby saving manufacturing costs.

Specifically, the first terminal 131 of the first data line 130 is connected to one end of a first connection line 134. Another end of the first connection line 134 is connected to a first extension line 135. The first extension line 135 and the first data line 130 are arranged parallel to each other and spaced apart from each other. An end of the first extension line 135 away from the first connection line 134 and the fourth terminal 142 of the second data line 140 are connected to the chip on film 150 on the same side of the substrate 110.

If a sum of resistance values of the first connection line 134 and the first extension line 135 is R20, and a resistance value between the first terminal 131 and the J1 is R10.

A voltage V1 across the $L1=(Vdd-4I*R10)-(Vss+4I*R20+3I*R2+2I*R2+I*R2)=Vdd-Vss-4I*(R10+R20)-(3I+2I+I)*R2$, where R1 is equivalent to R12, R13, or R14, and R2 is equivalent to R21, R22, or R23.

A voltage V2 across the $L2=(Vdd-4I*R10-3I*R1)-(Vss+4I*R20+3I*R2+2I*R2)=Vdd-Vss-4I*(R10+R20)-3I*(R1+R2)-2I*R2$, where R1 is equivalent to R12, R13, or R14, and R2 is equivalent to R21, R22, or R23.

A voltage V3 across the $L3=(Vdd-4I*R10-3I*R1-2I*R1)-(Vss+4I*R20+3I*R2)=Vdd-Vss-4I*(R10+R20)-3I*(R1+R2)-2I*R1$, where R1 is equivalent to R12, R13, or R14, and R2 is equivalent to R21, R22, or R23.

A voltage V4 across the $L4=(Vdd-4I*R10-3I*R1-2I*R1-I*R1)-(Vss+4I*R20)=Vdd-Vss-4I*(R10+R20)-(3I+2I+I)*R2$, where R1 is equivalent to R12, R13, or R14, and R2 is equivalent to R21, R22, or R23.

It can be seen that the maximum voltage drop (IR Drop) is still $I*(3R1-R2)$, so a winding design will not affect the voltage drop value.

Figure 6:
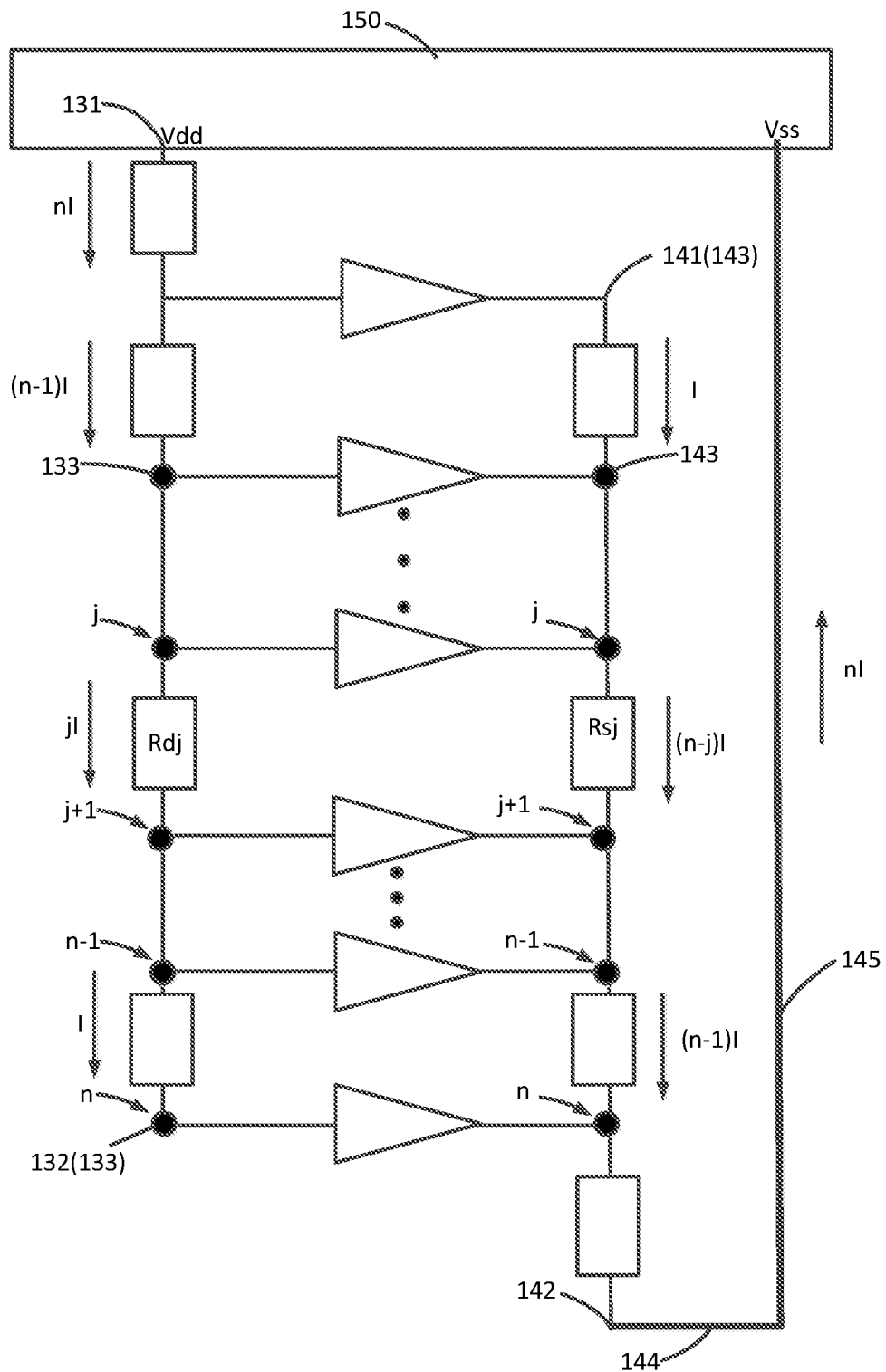
FIG. 6 is a circuit diagram showing a setting of a second extension line and a second connection line in an embodiment.

Alternatively, in other preferred embodiments of the present disclosure, as shown in FIG. 6, it is also possible to add a second connection line and a second extension line to the fourth terminal 142 of the second data line 140, so that the fourth terminal 142 and the first terminal 131 can be connected to the chip on film 150 in the same side of the substrate 110, thereby saving manufacturing costs.

Specifically, the fourth terminal 142 of the second data line 140 is connected to one end of a second connection line 144. Another end of the second connection line 144 is connected to a second extension line 145. The second extension line 145 and the second data line 140 are arranged parallel to each other and spaced apart from each other. An end of the second extension line 145 away from the second connection line 144 and the first terminal 131 of the first data line 130 are connected to the chip on film 150 on the same side of the substrate 110.

The principle and technical effect are basically similar to the technical solution of setting the first connection line 134 and the first extension line 135 at the first terminal 131 of the first data line 130, so they will not be repeated again.

Advantages of the present disclosure are as follows. In the backlight module and the display device of the present disclosure, the direction of current of the first data line or the second data line is changed, so the direction of current of the first data line is the same as the direction of current of the second data line, such that the current flowing into each light-emitting diode tends to be the same, thereby reducing the voltage drop. By limiting the resistance values of the first data line and the second data line between the light-emitting diode units, the voltage on both sides of each light-emitting diode unit is maintained consistent, and the brightness uniformity of the light-emitting diode group is improved.

The description of the above embodiments is only used to help understand the technical solutions and its core idea of the present disclosure. Those of ordinary skill in the art should understand that the technical solutions described in the foregoing embodiments can still be modified, or some of the technical features can be equivalently replaced. These modifications or replacements do not cause the essence of the corresponding technical solutions to deviate from the scope of the technical solutions of the embodiments of the present disclosure.

What is claimed is:
1. A backlight module, comprising:
   a first data line comprising a first terminal and a second terminal, wherein the first terminal is connected to a power terminal;
   a second data line comprising a third terminal and a fourth terminal, wherein the fourth terminal is connected to a ground terminal; and
   a light-emitting diode group comprising at least two light-emitting diode units, wherein one end of each of the light-emitting diode units is connected to the first data line, and another end of each of the light-emitting diode units is connected to the second data line;

wherein voltages at connection points of every adjacent two of the at least two light-emitting diode units and the first data line, and voltages at connection points of the adjacent two light-emitting diode units and the second data line satisfy a following relational expression:

in response to $V_i$ is greater than $V_j$, $U_i$ is greater than $U_j$, wherein $V_i$ denotes a voltage at a connection point of an i-th of the at least two light emitting diode units and the first data line; $V_j$ denotes a voltage at a connection point of the first data line and a j-th of the at least two light emitting diode units which is adjacent to the i-th light emitting diode unit; $U_i$ denotes a voltage at a connection point of the i-th light emitting diode unit and the second data line; and $U_j$ denotes a voltage at a connection point of the j-th light emitting diode unit and the second data line.

2. The backlight module according to claim 1, further comprising:
at least one first node disposed on the first data line; and
at least one second node disposed on the second data line, wherein an anode of one of the light-emitting diode units is connected to one first node, and a cathode of the one of the light-emitting diode units is connected to one corresponding second node.

3. The backlight module according to claim 2, wherein a resistance value between a j-th of the at least one first node and a j+1-th of the at least one first node and a resistance value between a j-th of the at least one second node and a j+1-th of the at least one second node satisfy a following relational expression:

(n−j)*Rdj=j*Rsj, wherein Rdj denotes the resistance value between the j-th of the at least one first node and the j+1-th of the at least one first node, Rsj denotes the resistance value between the j-th of the at least one second node and the j+1-th of the at least one second node, and j=1, 2, . . . n and n is a respective total number of the at least one first node and the at least one second node.

4. The backlight module according to claim 2, wherein a direction of current flowing into the first data line is a direction from the first terminal to the second terminal;
wherein a direction of current flowing into the second data line is a direction from the third terminal to the fourth terminal;
wherein in the direction of current, a voltage difference between two adjacent of the at least on first nodes, and a voltage difference between two adjacent of the at least one second nodes satisfy a following equation:
$H_1=H_2$, wherein $H_1$ denotes the voltage difference between the two adjacent first nodes, and $H_2$ denotes the voltage difference between the two adjacent second nodes.

5. The backlight module according to claim 2, wherein a resistance value between any two adjacent first nodes is equal;
wherein a resistance value between any two adjacent second nodes is equal; and
wherein the resistance value between any two adjacent first nodes is equal to the resistance value between any two adjacent second nodes.

6. The backlight module according to claim 1, further comprising:
a substrate, wherein the first data line and the second data line are arranged parallel to each other and spaced apart from each other on a surface of the substrate; and a chip on film disposed on at least one side of the substrate, wherein the first terminal and the fourth terminal are connected to the chip on film.

7. The backlight module according to claim 1, further comprising:
a first extension line, wherein the first extension line and the first data line are arranged parallel to each other and spaced apart from each other;
a first connection line, wherein two opposite ends of the first connection line are respectively electrically connected to the first terminal and an end of the first extension line adjacent to the first terminal; and
a chip on film disposed on a side of the substrate close to the ground terminal, wherein one end of the first extension line away from the first connection line is connected to the chip on film.

8. The backlight module according to claim 1, further comprising:
a second extension line, wherein the second extension line and the second data line are arranged parallel to each other and spaced apart from each other;
a second connection line, wherein two opposite ends of the second connection line are respectively electrically connected to the fourth terminal and an end of the second extension line adjacent to the fourth terminal; and
a chip on film disposed on a side of the substrate close to the power terminal, wherein one end of the second extension line away from the second connection line is connected to the chip on film.

9. The backlight module according to claim 6, wherein the power terminal and the ground terminal are respectively disposed on two opposite sides of the substrate, the chip on film is disposed on the two opposite sides of the substrate, and is electrically connected to the first terminal and/or the fourth terminal on a corresponding side.

10. A display device, comprising: a liquid crystal display panel and a backlight module, wherein the backlight module comprises:
a first data line comprising a first terminal and a second terminal, wherein the first terminal is connected to a power terminal;
a second data line comprising a third terminal and a fourth terminal, wherein the fourth terminal is connected to a ground terminal; and
a light-emitting diode group comprising at least two light-emitting diode units, wherein one end of each of the light-emitting diode units is connected to the first data line, and another end of each of the light-emitting diode units is connected to the second data line;
wherein voltages at connection points of every adjacent two of the at least two light-emitting diode units and the first data line, and voltages at connection points of the adjacent two light-emitting diode units and the second data line satisfy a following relational expression: in response to $V_i$ is greater than $V_j$, $U_i$ is greater than $U_j$, wherein $V_i$ denotes a voltage at a connection point of an i-th of the at least two light emitting diode units and the first data line; $V_j$ denotes a voltage at a connection point of the first data line and a j-th of the at least two light emitting diode units which is adjacent to the i-th light emitting diode unit; $U_i$ denotes a voltage at a connection point of the i-th light emitting diode unit and the second data line; and $U_j$ denotes a voltage at a connection point of the j-th light emitting diode unit and the second data line; and wherein the liquid crystal display panel is connected to the backlight module, and the backlight module is configured to provide a backlight source for the liquid crystal display panel.

11. The display device according to claim 10, further comprising:
at least one first node disposed on the first data line; and
at least one second node disposed on the second data line, wherein an anode of one of the light-emitting diode units is connected to one first node, and a cathode of the one of the light-emitting diode units is connected to one corresponding second node.

12. The display device according to claim 11,
wherein a resistance value between a j-th of the at least one first node and a j+1-th of the at least one first node, and a resistance value between a j-th of the at least one second node and a j+1-th of the at least one second node satisfy a following relational expression:
$(n-j)*Rdj=j*Rsj$, wherein Rdj denotes the resistance value between the j-th of the at least one first node and the j+1-th of the at least one first node, Rsj denotes the resistance value between the j-th of the at least one second node and the j+1-th of the at least one second node, and j=1, 2, . . . n and n is a respective total number of the at least one first node and the at least one second node.

13. The display device according to claim 11, wherein a direction of current flowing into the first data line is a direction from the first terminal to the second terminal;
wherein a direction of current flowing into the second data line is a direction from the third terminal to the fourth terminal;
wherein in the direction of current, a voltage difference between two adjacent of the at least one first nodes, and a voltage difference between two adjacent of the at least one second nodes satisfy a following equation:
$H_1=H_2$, wherein $H_1$ denotes the voltage difference between the two adjacent first nodes, and $H_2$ denotes the voltage difference between the two adjacent second nodes.

14. The display device according to claim 11, wherein a resistance value between any two adjacent first nodes is equal;
wherein a resistance value between any two adjacent second nodes is equal; and
wherein the resistance value between any two adjacent first nodes is equal to the resistance value between any two adjacent second nodes.

15. The display device according to claim 10, wherein the backlight module further comprises:
a substrate, wherein the first data line and the second data line are arranged parallel to each other and spaced apart from each other on a surface of the substrate; and
a chip on film disposed on at least one side of the substrate, wherein the first terminal and the fourth terminal are connected to the chip on film.

16. The display device according to claim 10, wherein the backlight module further comprises:
a first extension line, wherein the first extension line and the first data line are arranged parallel to each other and spaced apart from each other;
a first connection line, wherein two opposite ends of the first connection line are respectively electrically connected to the first terminal and an end of the first extension line adjacent to the first terminal; and
a chip on film disposed on a side of the substrate close to the ground terminal, wherein one end of the first extension line away from the first connection line is connected to the chip on film.

17. The display device according to claim 10, wherein the backlight module further comprises:
a second extension line, wherein the second extension line and the second data line are arranged parallel to each other and spaced apart from each other;
a second connection line, wherein two opposite ends of the second connection line are respectively electrically connected to the fourth terminal and an end of the second extension line adjacent to the fourth terminal; and
a chip on film disposed on a side of the substrate close to the power terminal, wherein one end of the second extension line away from the second connection line is connected to the chip on film.

18. The display device according to claim 15, wherein the power terminal and the ground terminal are respectively disposed on two opposite sides of the substrate, the chip on film is disposed on the two opposite sides of the substrate, and is electrically connected to the first terminal and/or the fourth terminal on a corresponding side.

19. A backlight module, comprising:
a first data line comprising a first terminal and a second terminal, wherein the first terminal is connected to a power terminal;
a second data line comprising a third terminal and a fourth terminal, wherein the fourth terminal is connected to a ground terminal;
a light-emitting diode group comprising at least two light-emitting diode units, wherein one end of each of the light-emitting diode units is connected to the first data line, and another end of each of the light-emitting diode units is connected to the second data line;
a substrate, wherein the first data line and the second data line are arranged parallel to each other and spaced apart from each other on a surface of the substrate; and
a chip on film disposed on at least one side of the substrate, wherein the first terminal and the fourth terminal are connected to the chip on film;
wherein voltages at connection points of every adjacent two of the at least two light-emitting diode units and the first data line, and voltages at connection points of the adjacent two light-emitting diode units and the second data line satisfy a following relational expression: in response to $V_i$ is greater than $V_j$, $U_i$ is greater than $U_j$, wherein $V_i$ denotes a voltage at a connection point of an i-th of the at least two light emitting diode units and the first data line; $V_j$ denotes a voltage at a connection point of the first data line and a j-th of the at least two light emitting diode units which is adjacent to the i-th light emitting diode unit; $U_i$ denotes a voltage at a connection point of the i-th light emitting diode unit and the second data line; and $U_j$ denotes a voltage at a connection point of the j-th light emitting diode unit and the second data line.

20. The backlight module according to claim 19, wherein the power terminal and the ground terminal are respectively disposed on two opposite sides of the substrate, the chip on film is disposed on the two opposite sides of the substrate, and is electrically connected to the first terminal and/or the fourth terminal on a corresponding side.

* * * * *